(12) United States Patent
Crago et al.

(10) Patent No.: US 7,587,033 B2
(45) Date of Patent: Sep. 8, 2009

(54) METHODS AND SYSTEMS FOR RENDERING VOICE MAIL MESSAGES AMENABLE TO ELECTRONIC PROCESSING BY MAILBOX OWNERS

(75) Inventors: William B. Crago, Stouffville (CA); David William Clark, Carp (CA); David Edward Johnston, Whitby (CA)

(73) Assignee: BCE Inc., Verdun, Quebec (CA)

( * ) Notice: Subject to any disclaimer, the term of this patent is extended or adjusted under 35 U.S.C. 154(b) by 330 days.

(21) Appl. No.: 11/289,581

(22) Filed: Nov. 30, 2005

(65) Prior Publication Data

US 2006/0140360 A1 Jun. 29, 2006

Related U.S. Application Data

(63) Continuation of application No. PCT/CA2005/001515, filed on Sep. 30, 2005.

(60) Provisional application No. 60/638,390, filed on Dec. 27, 2004.

(51) Int. Cl.
*H04M 11/00* (2006.01)
(52) U.S. Cl. .............. 379/88.14; 379/88.13; 379/88.17; 379/88.18; 379/88.23; 455/413; 455/414.1; 704/277; 709/201; 709/202; 709/203
(58) Field of Classification Search .............. 379/88.13, 379/88.14, 88.17, 88.18, 88.23; 455/413, 455/414.1; 704/277; 709/201, 202, 203
See application file for complete search history.

(56) References Cited

U.S. PATENT DOCUMENTS

| | | | |
|---|---|---|---|
| 5,003,577 A | | 3/1991 | Ertz et al. |
| 5,475,738 A | * | 12/1995 | Penzias .................. 379/88.14 |
| 5,568,540 A | | 10/1996 | Greco et al. |
| 5,737,395 A | | 4/1998 | Irribarren |
| 5,835,570 A | | 11/1998 | Wattenbarger |

(Continued)

FOREIGN PATENT DOCUMENTS

EP 1 014 653 A2 6/2000

(Continued)

OTHER PUBLICATIONS

Lucent Technologies, Video Mail for Services Providers, 2005, 2 pages, http://www.lucent.com/products/solution/0,,CTID+2014-STID+10535-SOID+1639-LOCL+1,00.html.

(Continued)

*Primary Examiner*—Fan Tsang
*Assistant Examiner*—Hemant Patel (57) ABSTRACT

A method for execution by an owner of a mailbox in a voice mail system. The method comprises using an access device to access a voicemail message contained in the mailbox and entering a command instrumental in causing the voicemail message to be forwarded over a telephone network to a conversion entity. At the conversion entity, an electronic representation of the voicemail message is created and then the electronic representation of the voicemail message is rendered accessible to the owner of the mailbox, e.g., by sending an email message to a predetermined address. In this way, electronic representations of voicemail messages in a mailbox can be accessed by the owner of the mailbox using a device of choice, not necessarily the access device used initially to enter the command. Also, this functionality is achieved while allowing the voice mail system to remain a legacy voice mail system.

36 Claims, 5 Drawing Sheets

U.S. PATENT DOCUMENTS

| | | | |
|---|---|---|---|
| 5,838,768 A * | 11/1998 | Sumar et al. ............... 379/88.14 |
| 5,870,454 A * | 2/1999 | Dahlen .................... 379/88.14 |
| 5,898,770 A | 4/1999 | Valentine |
| 5,956,390 A | 9/1999 | McKibben et al. |
| 6,085,231 A * | 7/2000 | Agraharam et al. ......... 709/206 |
| 6,163,596 A | 12/2000 | Gelfer et al. |
| 6,198,916 B1 * | 3/2001 | Martin et al. ............... 455/413 |
| 6,219,413 B1 | 4/2001 | Burg |
| 6,249,815 B1 | 6/2001 | Foladare et al. |
| 6,266,400 B1 | 7/2001 | Castagna |
| 6,292,799 B1 | 9/2001 | Peek et al. |
| 6,351,522 B1 | 2/2002 | Vitikainen |
| 6,385,306 B1 | 5/2002 | Baxter |
| 6,456,700 B1 | 9/2002 | Malik |
| 6,459,774 B1 | 10/2002 | Ball et al. |
| 6,487,278 B1 | 11/2002 | Skladman et al. |
| 6,535,585 B1 | 3/2003 | Hanson et al. |
| 6,553,222 B1 | 4/2003 | Weiss |
| 6,587,871 B1 * | 7/2003 | Schrader .................... 709/206 |
| 6,590,965 B1 | 7/2003 | Poole et al. |
| 6,603,846 B1 | 8/2003 | Cannon et al. |
| 6,625,258 B1 * | 9/2003 | Ram et al. ............... 379/88.13 |
| 6,633,630 B1 * | 10/2003 | Owens et al. ............ 379/93.24 |
| 6,665,378 B1 | 12/2003 | Spielman et al. |
| 6,671,355 B1 * | 12/2003 | Spielman et al. ......... 379/88.12 |
| 6,683,940 B2 * | 1/2004 | Contractor ............... 379/88.17 |
| 6,687,340 B1 * | 2/2004 | Goldberg et al. ......... 379/88.14 |
| 6,687,362 B1 | 2/2004 | Lindquist et al. |
| 6,738,465 B1 | 5/2004 | Hu |
| 6,741,679 B1 | 5/2004 | Malik |
| 6,754,202 B1 | 6/2004 | Sun et al. |
| 6,757,732 B1 | 6/2004 | Sollee et al. |
| 6,775,360 B2 | 8/2004 | Davidson et al. |
| 6,778,644 B1 | 8/2004 | Jenkins et al. |
| 6,792,082 B1 | 9/2004 | Levine |
| 6,795,541 B2 | 9/2004 | Oren |
| 6,813,489 B1 | 11/2004 | Wu et al. |
| 6,823,047 B1 | 11/2004 | Cruickshank |
| 6,826,270 B1 | 11/2004 | Welch et al. |
| 6,853,714 B2 | 2/2005 | Liljestrand et al. |
| 6,868,140 B2 | 3/2005 | Myers et al. |
| 6,987,840 B1 * | 1/2006 | Bosik et al. ............... 379/88.17 |
| 7,009,990 B1 * | 3/2006 | Adams et al. ............... 370/429 |
| 7,072,452 B1 * | 7/2006 | Roberts et al. ........... 379/88.23 |
| 7,103,154 B1 * | 9/2006 | Cannon et al. ............. 379/67.1 |
| 7,133,899 B2 | 11/2006 | Rowe |
| 7,145,998 B1 | 12/2006 | Holder et al. |
| 7,149,777 B1 | 12/2006 | Rhee |
| 7,212,614 B1 | 5/2007 | Burg et al. |
| 7,272,390 B1 | 9/2007 | Adachi et al. |
| 7,277,696 B2 * | 10/2007 | Preiss et al. ............... 455/414.4 |
| 7,283,808 B2 | 10/2007 | Castell et al. |
| 7,317,908 B1 * | 1/2008 | Eason ....................... 455/413 |
| 7,373,141 B2 * | 5/2008 | Kwon ....................... 455/414.4 |
| 7,444,375 B2 * | 10/2008 | McConnell et al. ......... 709/206 |
| 2001/0026545 A1 | 10/2001 | Matsumoto et al. |
| 2002/0055351 A1 | 5/2002 | Elsey et al. |
| 2002/0076004 A1 | 6/2002 | Brockenbrough et al. |
| 2002/0110226 A1 | 8/2002 | Kovales et al. |
| 2002/0122541 A1 | 9/2002 | Metcalf |
| 2002/0160757 A1 * | 10/2002 | Shavit et al. ............... 455/414 |
| 2002/0186828 A1 | 12/2002 | Bushnell |
| 2003/0043974 A1 | 3/2003 | Emerson |
| 2003/0050046 A1 | 3/2003 | Conneely et al. |
| 2003/0108166 A1 | 6/2003 | Coppinger et al. |
| 2003/0202641 A1 * | 10/2003 | Huang ..................... 379/88.13 |
| 2003/0216137 A1 | 11/2003 | Hymel |
| 2004/0057425 A1 | 3/2004 | Brouwer et al. |
| 2004/0057562 A1 * | 3/2004 | Myers et al. ............. 379/88.14 |
| 2004/0076272 A1 * | 4/2004 | Zafar et al. ............... 379/88.13 |
| 2004/0141594 A1 | 7/2004 | Brunson et al. |
| 2004/0151287 A1 | 8/2004 | Bedner |
| 2004/0208297 A1 | 10/2004 | Valentine |
| 2004/0252679 A1 | 12/2004 | Williams et al. |
| 2005/0010573 A1 * | 1/2005 | Garg ........................... 707/10 |
| 2005/0047579 A1 | 3/2005 | Salame |
| 2005/0101303 A1 | 5/2005 | Pelaez et al. |
| 2005/0207431 A1 | 9/2005 | Monai |
| 2006/0062371 A1 | 3/2006 | Vanderheiden et al. |
| 2006/0072718 A1 * | 4/2006 | Satzke et al. ............... 379/88.17 |
| 2006/0177022 A1 * | 8/2006 | Lai et al. .................. 379/88.14 |
| 2007/0032267 A1 | 2/2007 | Haitani et al. |
| 2007/0115919 A1 | 5/2007 | Chahal et al. |

FOREIGN PATENT DOCUMENTS

| | | |
|---|---|---|
| EP | 1 280 326 A1 | 1/2003 |
| WO | WO 03/055191 A1 | 7/2003 |
| WO | WO 03/092248 A2 | 11/2003 |
| WO | PCT/CA2005/001514 | 1/2006 |
| WO | PCT/CA2005/001515 | 1/2006 |
| WO | PCT/CA2005/001516 | 1/2006 |
| WO | PCT/CA2005/001517 | 1/2006 |

OTHER PUBLICATIONS

Office Action mailed on Apr. 25, 2008 in connection with U.S. Appl. No. 11/289,582.

Office Action mailed on May 9, 2008 in connection with U.S. Appl. No. 11/289,580.

Office Action mailed on May 13, 2008 in connection with U.S. Appl. No. 11/289,692.

Office Action mailed on Mar. 25, 2009 in connection with U.S. Appl. No. 11/289,582.

Office Action mailed on Jun. 22, 2009 in connection with U.S. Appl. No. 11/289,692.

* cited by examiner

METHODS AND SYSTEMS FOR RENDERING VOICE MAIL MESSAGES AMENABLE TO ELECTRONIC PROCESSING BY MAILBOX OWNERS

CROSS-REFERENCE TO RELATED APPLICATIONS

This application is a continuation of PCT Patent Application Ser. No. PCT/CA2005/001515, filed on Sep. 30, 2005, designating the United States and hereby incorporated by reference herein.

This application claims the benefit under 35 U.S.C. 119(e) of U.S. Provisional Patent Application Ser. No. 60/638,390 to William Crago et al., filed Dec. 27, 2004, hereby incorporated by reference herein.

FIELD OF THE INVENTION

The present invention relates generally to electronic communications and, more particularly, to methods and systems for rendering voice mail messages contained in mailboxes amenable to electronic processing by owners of those mailboxes.

BACKGROUND

Voice mail systems provide a convenient way for a calling party to leave a message for an intended recipient who is unavailable to answer an incoming call. Specifically, a conventional voice mail system detects when the intended recipient is busy or unresponsive to the call, and consequently answers the call by playing the intended recipient's audio greeting. Following this, the calling party is prompted to record a voice mail message, which is stored as an audio recording in a voice mailbox associated with the intended recipient.

When the owner of the mailbox (i.e., the intended recipient) wishes to retrieve the contents of the mailbox at a later time, the owner of the mailbox dials into the voice mail system. The voice mail system authenticates the owner of the mailbox, and subsequently allows the owner of the mailbox to navigate through his or her mailbox in order to perform various basic functions, such as playback, deletion and forwarding of individual voice mail messages.

With the decreasing cost of memory, voice mail systems now permit a calling party to leave increasingly lengthy voice mail messages. In view of the large amount of information that can be conveyed in a voice mail message, the owner of the mailbox may desire to do more than merely listen to each message. Instead, the owner of the mailbox may wish to perform a more sophisticated processing function on the contents of one or more voice mail messages. For example, the mailbox owner may wish to use his or her personal digital assistant (PDA) to extract, save and/or distribute specific information conveyed in a given voice mail message. In other cases, the mailbox owner may wish to use his or her desktop computer to transfer the voice mail message to a computer-readable storage medium for archiving.

However, the basic voice mail systems which exist in many of today's businesses do not allow the aforementioned functionality to be achieved. Specifically, conventional voice mail systems do not render voice mail messages electronically processable by mailbox owners using a device of their choice. Rather, mailbox owners who wish to extract information from their voice mail messages are restricted to hastily transcribing their messages on paper while listening to them. Clearly, therefore, a need exists in the industry to alleviate this difficulty, while recognizing that businesses may be reluctant to overhaul their existing voice mail systems.

SUMMARY OF THE INVENTION

In accordance with a first broad aspect, the present invention seeks to provide a method for execution by an owner of a mailbox in a voice mail system. The method comprises accessing a voice mail message contained in the mailbox; and entering a command instrumental in causing the voice mail message to be forwarded over a telephone network to a conversion entity operative to render an electronic representation of the voice mail message accessible to the owner of the mailbox.

In accordance with a second broad aspect, the present invention seeks to provide a voice mail system, which comprises a plurality of mailboxes associated with respective owners, each of the mailboxes having a capacity to hold one or more voice mail messages; and a processing entity adapted to receive a command indicative of a desire to forward a particular voice mail message held in a particular one of the mailboxes to a conversion entity reachable at a designated telephone number. The processing entity is responsive to said command to forward the particular voice mail message to the conversion entity and to cause the conversion entity to render an electronic representation of the particular voice mail message accessible to the owner of the particular mailbox.

In accordance with a third broad aspect, the present invention seeks to provide a method for execution by a conversion entity reachable over a telephone network at a designated telephone number. The method comprises receiving a particular voice mail message forwarded by a voice mail system over the telephone network, the voice mail system comprising a plurality of mailboxes respectively associated with owners, a particular one of the mailboxes holding the particular voice mail message; creating an electronic representation of the particular voice mail message; and rendering the electronic representation of the particular voice mail message accessible to the owner of the particular mailbox.

In accordance with a fourth broad aspect, the present invention seeks to provide a system that comprises at least one conversion entity reachable over a telephone network at a respective designated telephone number. Each of the at least one conversion entity has a processing entity adapted for (a) receiving a particular voice mail message forwarded by a voice mail system over the telephone network, the voice mail system comprising a plurality of mailboxes respectively associated with owners, a particular one of the mailboxes holding the particular voice mail message; (b) creating an electronic representation of the particular voice mail message; and (c) rendering the electronic representation of the particular voice mail message accessible to the owner of the particular mailbox.

These and other aspects and features of the present invention will now become apparent to those of ordinary skill in the art upon review of the following description of specific embodiments of the invention in conjunction with the accompanying drawings.

DETAILED DESCRIPTION OF EMBODIMENTS

Depositing a Voice Mail Message

Figure 1A:
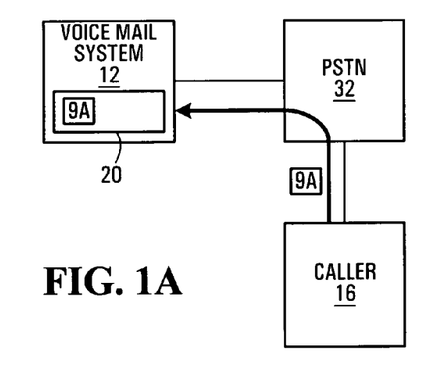
FIGS. 1A and 1B illustrate deposit of a voice mail message into a mailbox of a voice mail system.
Figure 1B:
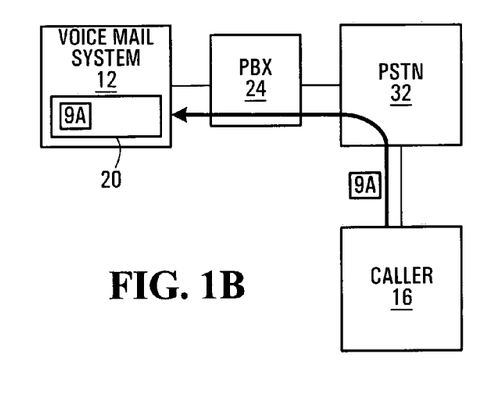

With reference to FIGS. 1A and 1B, a voice mail system 12 comprises a set of mailboxes. Each of the mailboxes, including mailbox 20, has the capability of holding one or more voice mail messages. Each of the mailboxes, including mailbox 20, is associated with a party that is hereinafter referred to as the "owner" of the respective mailbox.

In FIGS. 1A and 1B, a given caller 16 attempts to reach the owner of mailbox 20 over a telephone network such as the public switched telephone network (PSTN) 32. For example, in FIG. 1A, the caller 16 directly dials the telephone number of the owner of mailbox 20, whereas in FIG. 1B, the caller 16 passes through a private branch exchange (PBX) 24.

In the event that the owner of mailbox 20 is busy or not responding, the voice mail system 12 begins an interaction with the caller 16 and prompts the caller 16 to begin recording a voice mail message 9A for the owner of mailbox 20. Upon termination of the recording, the voice mail system 12 holds voice mail message 9A in mailbox 20 for subsequent retrieval by the owner of mailbox 20. Commonly, the voice mail message 9A may be stored as an audio recording, which may be in a format such as ".wav" or ".au", for example.

Retrieving a Voice Mail Message from the Voice Mail System

Figure 2A:
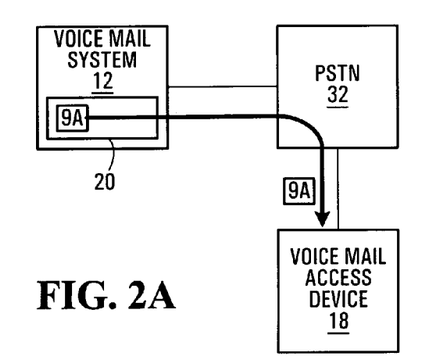
FIGS. 2A and 2B illustrate retrieval of the voice mail message from the mailbox.
Figure 2B:
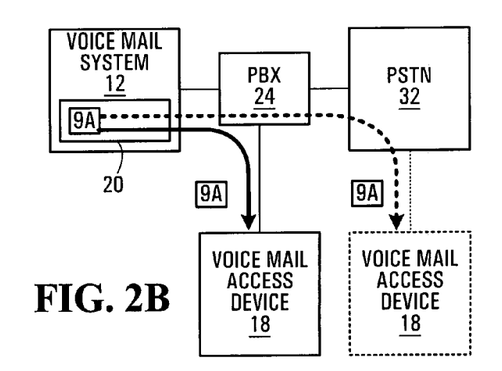

With reference to FIGS. 2A and 2B, the owner of mailbox 20 uses a voice mail access device 18 to interact with the voice mail system 12 in order to retrieve voice mail messages held in mailbox 20, including voice mail message 9A. In examples of specific non-limiting embodiments, the voice mail access device 18 may be a conventional telephone which is connected to the PSTN 32 via a digital switch, or a Voice over Internet Protocol (VoIP) telephone that is connected to the PSTN 32 via a data network and a gateway therebetween, or a software application running on a computer that is connected to the PSTN 32 via a data network and a gateway, etc.

The actions of the owner of mailbox 20 which lead to retrieval of the voice mail message 9A can take on many forms. In the case where the voice mail system 12 is a legacy voice mail system, the owner of mailbox 20 uses the voice mail access device 18 to cause a sequence of digits to be dialed via the PSTN 32, which is recognized by a switch (e.g., in the PSTN 32 in FIG. 2A, or the PBX 24 in FIG. 2B) as a command to redirect the call to the voice mail system 12. Once in communication with the voice mail system 12, the owner of mailbox 20 is authenticated in a conventional manner and is then given access to the contents of mailbox 20 (which, it is recalled, includes voice mail message 9A).

The owner of mailbox 20 may dispose of the current or most recently played message by entering a command. For example, should the owner of mailbox 20 choose to listen to voice mail message 9A, the owner of mailbox 20 enters a "playback command" (e.g., a sequence of digits) via the voice mail access device 18. The playback command is recognized by the voice mail system 12, which subsequently begins audio playback of voice mail message 9A. On the other hand, should the owner of mailbox 20 choose to delete voice mail message 9A, the owner of mailbox 20 enters a "delete command" (e.g., a different sequence of digits) via the voice mail access device 18. The delete command is recognized by the voice mail system 12, which subsequently deletes the voice mail message 9A from mailbox 20.

Figure 3A:
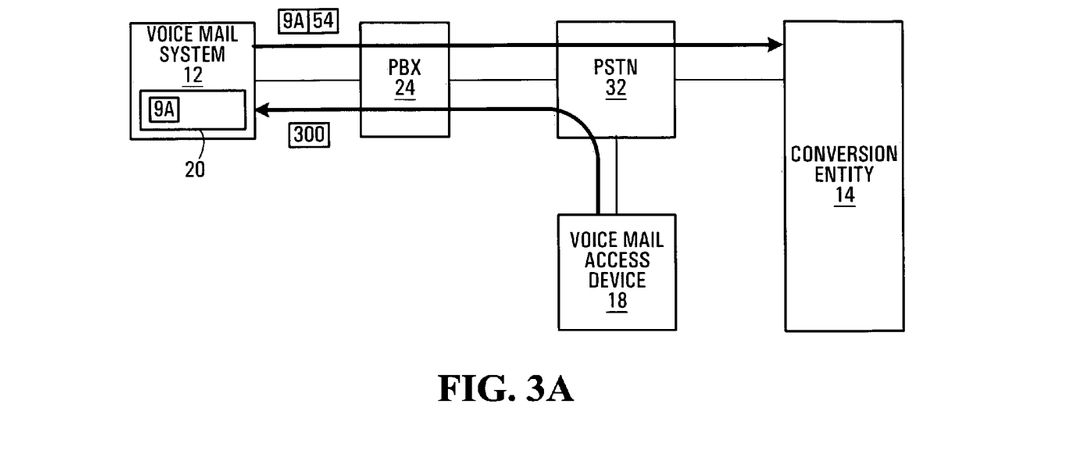
FIGS. 3A and 3B illustrate forwarding of the voice mail message to a conversion entity in accordance with two non-limiting embodiments of the present invention.
Figure 3B:
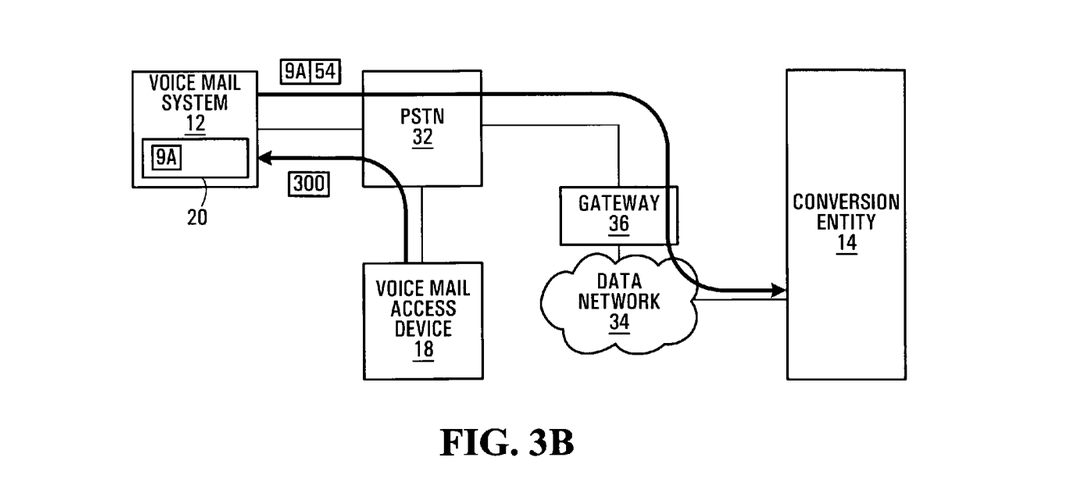
Figure 3C:
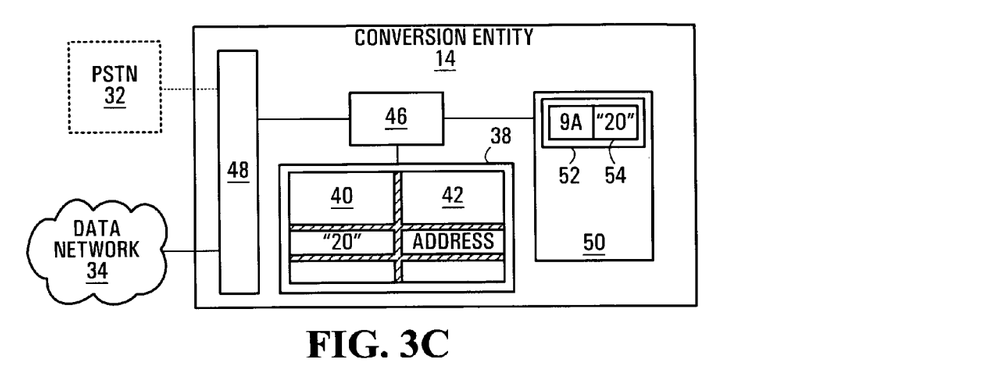
FIG. 3C is a schematic block diagram of the conversion entity, in accordance with a non-limiting embodiment of the present invention.

Alternatively, the owner of mailbox 20 may choose to forward voice mail message 9A to a particular destination. In accordance with an embodiment of the present invention, and as shown in FIGS. 3A-3C, an example of a destination to which voice mail message 9A may be forwarded is a "conversion entity" 14. The conversion entity 14 may be operated by the owner of the PSTN 32 or it may be operated by an independent third party.

As shown in FIG. 3A, the conversion entity 14 may be connected directly to the PSTN 32. Specifically, the conversion entity 14 is reachable at a designated telephone number (e.g., local, long-distance, toll-free, etc). When a call is placed from the PSTN 32 to that designated telephone number, the call travels through the PSTN 32 and is routed to the conversion entity 14.

Alternatively, as shown in FIG. 3B, the conversion entity 14 may be connected to the PSTN 32 via a data network 34, such as the Internet for example. The data network 34 is connected to the PSTN 32 via a gateway 36. As in FIG. 3A, the conversion entity 14 is associated with a designated telephone number. However, in this case, when a call is placed from the PSTN 32 to that designated telephone number, it is intercepted by the gateway 36. The gateway 36 recognizes the designated telephone number and thus interprets the call as being destined for the conversion entity 14. The gateway 36 then consults a table (not shown) which maps the designated telephone number of the conversion entity 14 to an address (e.g., an IP address in the data network 34) at which the conversion entity 14 can actually be reached. The gateway 36 then ensures transparent communication between the caller in the PSTN 32 and the conversion entity 14 (connected to the data network 34).

In either of the above-described scenarios, a PBX 24 or equivalent may or may not be present. For example, when voice mail system 12 is operated by the owner of the PSTN 32, then there is typically no PBX 24. Alternatively, in a corporate voice mail system 12, the voice mail system 12 is owned by a third party and hence a PBX 24 is likely to be present.

Forwarding a Voice Mail Message

In either of the above-described scenarios, and with continued reference to FIGS. 3A and 3B, the owner of mailbox 20 enters a "forwarding command" 300 (e.g., a sequence of digits) via the voice mail access device 18 in order to initiate forwarding of the current or most recently played voice mail message (which may in fact be voice mail message 9A) to the conversion entity 14. The forwarding command 300 identifies the conversion entity 14, either explicitly or implicitly. For example, the forwarding command 300 may include a first portion which is indicative of a standard forwarding function followed by a second portion that includes either the digits of the designated telephone number of the conversion entity 14 or a code that is translated by the voice mail system 12 into the digits of the designated telephone number of the conversion entity 14. Alternatively, the forwarding command 300 may be a customized forwarding function that implicitly signals an intent to forward the current or most recently played voice mail message to the conversion entity 14.

Upon receipt of the forwarding command 300 which either explicitly or implicitly identifies the conversion entity 14, the voice mail system 12 initiates a forward of voice mail message 9A to the conversion entity 14. In addition, "ancillary data" 54 is sent to the conversion entity 14. The ancillary data 54 specifies various parameters associated with voice mail message 9A, such as the identity of mailbox 20 where voice mail message 9A was stored.

The ability to forward a voice mail message along with ancillary data associated therewith to a chosen telephone number is a feature of most legacy voice mail systems, hence no change is required to existing voice mail systems. For example, network-layer protocols such as AMIS A or D, or VPIM, can be used to forward voice mail message 9A and ancillary data 54 to the conversion entity 14. In other embodiments, an outcall can be placed by the voice mail system 12 to the conversion entity 14. Still other ways of forwarding voice mail message 9A and ancillary data 54 to the conversion entity 14 will be known to those of ordinary skill in the art.

It is noted that where multiple voice mail systems 12, each with a similar mailbox structure, are in use and are capable of reaching the same conversion entity 14 via the PSTN 32, ambiguity may arise in the ancillary data that identifies like-numbered mailboxes originating from different voice mail systems 12. To resolve this potential ambiguity, the ancillary data 54 can be augmented to additionally include the identity of the specific voice mail system from which voice mail message 9A originated.

Conversion Entity 14

A specific non-limiting embodiment of the conversion entity 14 is now described in greater detail with reference to FIG. 3C. The conversion entity 14 comprises an interface 48 connected to a processing entity 46. It is recalled that under one scenario being contemplated herein (FIG. 3B), the conversion entity 14 is connected to the data network 34 (such as the Internet) and thus it should be understood that the interface 48 will be adapted for communication over the data network 34. Under another scenario being contemplated herein (FIG. 3A), the conversion entity 14 is reachable via the PSTN 32; nevertheless, as shown in FIG. 3C, the conversion entity 14 will still be connected to the data network 34, although in this case the interface 48 will be adapted for communication over both the PSTN 32 and the data network 34.

The processing entity 46 is connected to a memory 50, which comprises a plurality of records. Each record in the memory 50 stores information forwarded from the voice mail system 12, such as voice mail messages and ancillary data associated therewith. One such record 52 stores voice mail message 9A and ancillary data 54 which specifies mailbox 20. Thus, when the conversion entity 14 is contacted by the voice mail system 12 wishing to transfer voice mail message 9A and ancillary data 54, the processing entity 46 in the conversion entity 14 ensures that voice mail message 9A and ancillary data 54 are properly received and placed into record 52 in the memory 50.

The processing entity 46 is also connected to a database 38, which maps an "originating mailbox" field 40 to an "associated address" field 42. The entries in the database 38 may be populated during a preliminary registration phase. For example, the conversion entity 14 may be accessible via the Internet, thus allowing the owner of mailbox 20 to enter his or her mailbox (i.e., mailbox 20) in the "originating mailbox" field 40 of a given entry as well as a desired address in the "associated address" field of the given entry. The "associated address" field 42 represents one or more address(es) to which the owner of the mailbox in the corresponding "originating mailbox" field 40 wishes to have electronic representations of his or her voice mail messages delivered for eventual processing or retrieval. The "associated address" field 42 may be an electronic mail address, an instant messaging address, an SMS address, an IP address, etc.

Several non-limiting examples of ways in which the processing entity 46 renders an electronic representation of voice mail message 9A accessible to the owner of mailbox 20 will now be described with reference to FIGS. 4, 5 and 6, respectively.

Figure 4:
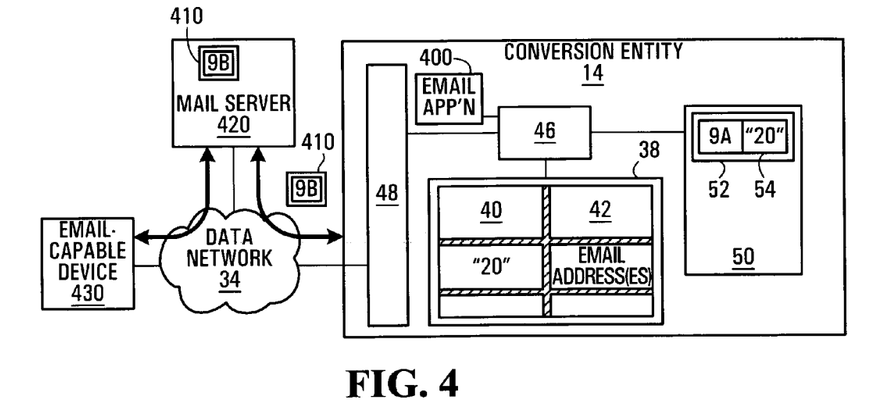
FIGS. 4-6 show various ways of rendering an electronic representation of the voice mail message accessible to the owner of the mailbox.

With reference to FIG. 4, the processing entity 46 runs an electronic mail (email) application 400, which reformats voice mail message 9A in record 52 into a file 9B suitable for attachment to an email message 410. Non-limiting examples of reformatting include changing the format from speech to text, or from .wav or .au to MP3 audio, etc. The email application 400 also consults the database 38 to extract the contents of the "associated address" field 42 associated with the "originating mailbox" field 40 that corresponds to the mailbox specified in record 52. In this example, the extracted "associated address" is an email address associated with the owner of mailbox 20. Of course, the extracted "associated address" may include a set of more than one email address.

The extracted email address implicitly specifies the address of a mail server 420 that is hosted by a service provider with which the owner of mailbox 20 has an account. The email application 400 proceeds to deliver the email message 410 (which includes the attachment 9B representative of voice mail message 9A) to the mail server 420 over the data network 34. When more than one email address is extracted from the database 38, then a corresponding number of email messages is sent in similar fashion. The mail server 420 stores the email message 410 for the benefit of its intended recipient, i.e., the owner of mailbox 20. Once at the mail server 420, the email message 410 can be pushed to an email-capable device 430, such as a desktop computer, personal digital assistant, smart phone, etc., that the owner of mailbox 20 may be using. Alternatively, the owner of mailbox 20 may employ the email-capable device 430 to pull the email message 410 from the email server 420. It should be noted that the email-capable device 430 can be different from the voice mail access device 18 used by the owner of mailbox 20 to enter the forwarding command 300.

Figure 5:
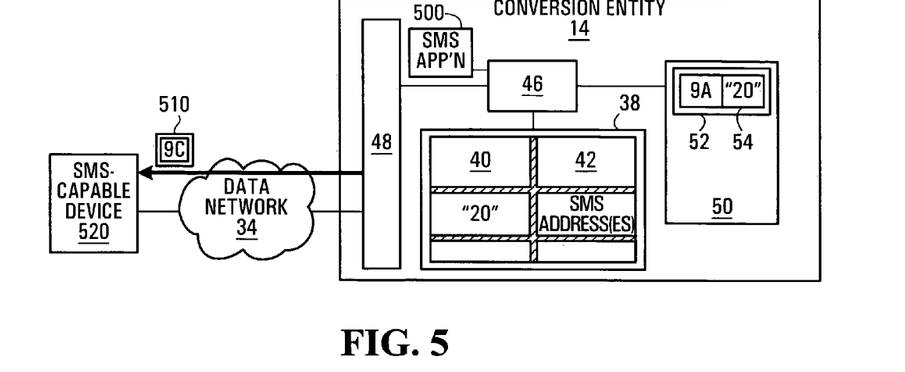

With reference now to FIG. 5, the processing entity 46 runs an SMS application 500, which reformats voice mail message 9A into a text message 9C suitable for transmittal within an SMS message 510. The SMS application 500 also consults the database 38 to extract the contents of the "associated address" field 42 associated with the "originating mailbox" field 40 that corresponds to the mailbox specified in record 52. In this example, the extracted "associated address" is an SMS address associated with the owner of mailbox 20, such as an IP address of an SMS-capable communication device 520. The SMS application 500 proceeds to deliver the SMS message 510 (which includes the text message 9C representative of voice mail message 9A) to the SMS-capable communication device 520 over the data network 34. It should be noted that the SMS-capable device 520 can be different from the voice mail access device 18 used by the owner of mailbox 20 to enter the forwarding command 300.

Figure 6:
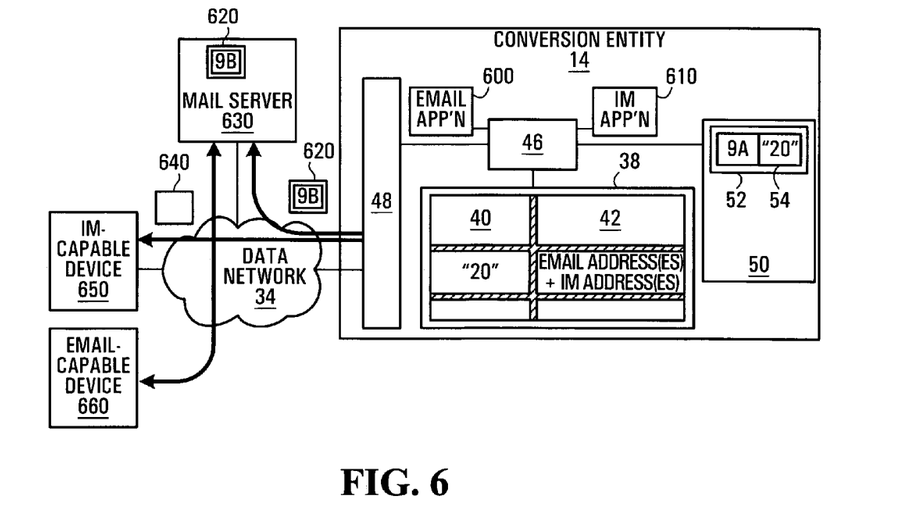

With reference to FIG. 6, the processing entity 46 runs both an electronic mail (email) application 600 and an instant messaging (IM) application 610. The email application 600 reformats voice mail message 9A into a file 9B suitable for attachment to an email message 620. Non-limiting examples of reformatting include changing the format from speech to text, or from .wav or .au to MP3 audio, etc. The email application 600 also consults the database 38 to extract an email address from the "associated address" field 42 associated with the "originating mailbox" field 40 that corresponds to the mailbox specified in record 52. The extracted email address implicitly specifies the address of a mail server 630 that is hosted by a service provider with which the owner of mailbox 20 has an account. In addition, the IM application 610 also consults the database 38 to extract an IM address from the "associated address" field 42 associated with the "originating mailbox" field 40 that corresponds to the mailbox specified in record 52. An example of an IM address is an IP address of an IM-capable device 650 such as a smart phone.

The email application 600 proceeds to deliver the email message 620 (which includes the attachment 9B representative of voice mail message 9A) to the mail server 630 over the data network 34. The mail server 630 stores the email message 610 for the benefit of its intended recipient, i.e., the owner of mailbox 20. Meanwhile, an instant message (IM) 640 is delivered over the data network 34 to the IM-capable device 650. The IM 640 serves to notify the owner of mailbox 20 that an email message 620 containing an electronic representation of voice mail message 9A has been transmitted. The use of an IM is beneficial when the email-capable device 660 is different from the IM-capable device 650 (e.g., desktop computer vs. smart phone). Upon receiving notification by way of the IM 640, the owner of mailbox 20 may use his or her email-capable device 660 to retrieve the email message 620 from the mail server 630 at his or her leisure. It should be noted that the email-capable device 660 and the IM-capable device 650 can be different from the voice mail access device 18 used by the owner of mailbox 20 to enter the forwarding command 300.

From the above description, it will be apparent that the owner of mailbox 20 can access electronic representations of voice mail messages stored therein using his or her preferred device (e.g., personal digital assistant, desktop computer, smart phone, etc.) to effect any desired processing or archiving functions. This preferred device may be different from the voice mail access device 18 used to enter the forwarding command 300. All this can be achieved while allowing the voice mail system 12 to remain a legacy voice mail system, which can translate into a significant cost savings for the owner/operator of the voice mail system 12.

Variants

Figure 7:
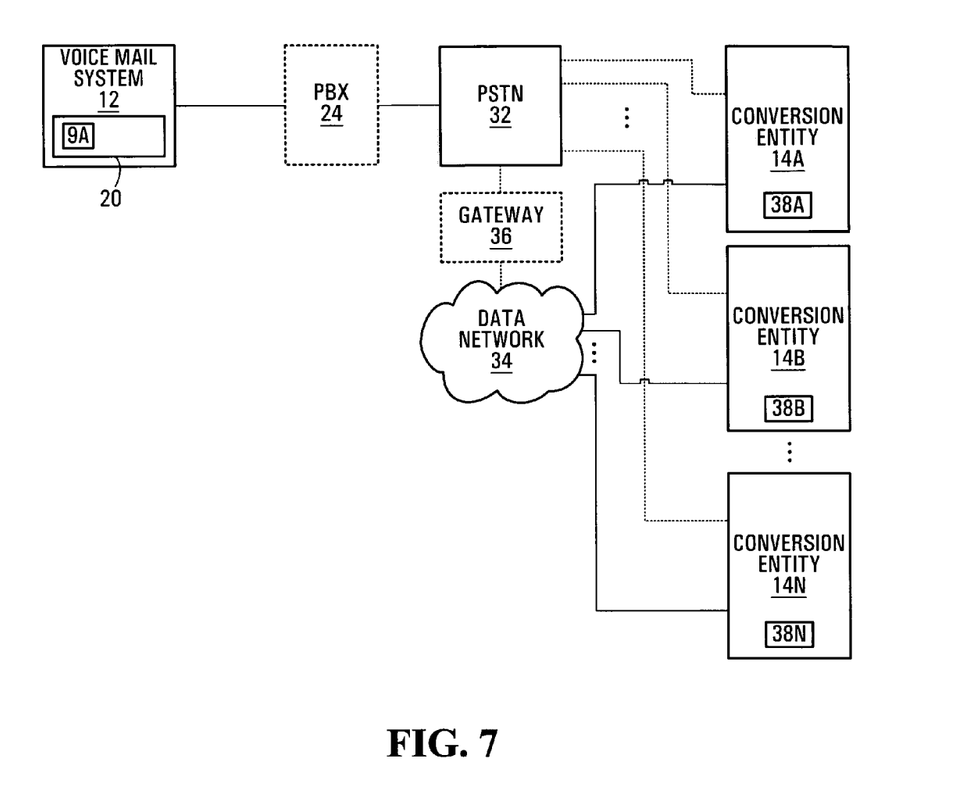
FIG. 7 is a schematic block diagram showing an alternative non-limiting embodiment of the present invention.

Reference is now made to FIG. 7, which shows a plurality of conversion entities 14A, 14B, ..., 14N, each of which is reachable over the PSTN 32 using a different designated telephone number. In addition, the conversion entities 14A, 14B, ..., 14N are connected to the data network 34. In some cases, the conversion entities 14A, 14B, ..., 14N will be connected directly to the PSTN 32 and in others, they may be connected thereto via a gateway 36 that links the PSTN 32 and a data network 34. Thus, the gateway 36 and the direct links between the PSTN 32 and the conversion entities 14A, 14B, ..., 14N are shown in dashed outline. Moreover, a PBX 24 may or may not be present between the voice mail system and the PSTN 32, and thus the PBX 24 is also shown in dashed outline.

Conversion entity 14A maintains a database 38A, while conversion entity 14B maintains a similar database 38B, and so on. The structure of the databases 38A, 38B, ..., 38N is identical to that of database 38 in FIG. 4. That is to say, each of the databases 38A, 38B, ..., 38N maps an "originating mailbox" field 40 to an "associated address" field 42. In fact, the same mailbox (say, mailbox 20) will be found in the "originating mailbox" field 40 in each of databases 38A, 38B, ..., 38N. However, it is the corresponding entry in the "associated address" field 42 that varies from one database to the next.

In other words, each of the databases 38A, 38B, ..., 38N maintains a different address corresponding to the same originating mailbox (e.g., mailbox 20), thus allowing the owner of mailbox 20 to select a particular address to which to forward a particular voice mail message (in this case, voice mail message 9A). For example, to trigger forwarding of an electronic representation of voice mail message 9A to the address to which database 38A maps, the owner of mailbox 20 enters a forwarding command to cause voice mail message 9A to be forwarded to conversion entity 14A. Analogously, to trigger forwarding of an electronic representation of voice mail message 9A to the address to which database 38B maps, the owner of mailbox 20 forwards' voice mail message 9A to conversion entity 14B, and so on.

A variety of techniques can be used to trigger forwarding of an electronic representation of a voice mail message to the address that is the outcome of the mapping stored in the database maintained by the desired conversion entity (one of 14A, 14B, ..., 14N). These techniques include those based on the previously described notion of a forwarding command, which either explicitly or implicitly identifies the desired conversion entity 14A, 14B, ..., 14N. For example, the forwarding command may include a first portion which is indicative of a standard forwarding function followed by a second portion that includes either the digits of the designated telephone number of the desired conversion entity 14A, 14B, ..., 14N or a code that is translated by the voice mail system 12 into the digits of the designated telephone number of the desired conversion entity 14A, 14B, ..., 14N. Alternatively, the forwarding command may be a customized forwarding function that implicitly signals an intent to forward the current or most recently played voice mail message to the desired conversion entity 14A, 14B, ..., 14N.

Control of message disposition in the above-described manner may be useful in cases where, for example, a mobile professional desires to access an electronic representation of a first voice mail message via his or her wireless email-capable device, while desiring to render an electronic representation of a second voice mail message accessible to his or her administrative assistant who is currently in the office. Other circumstances are of course envisaged. Generally speaking, the owner of mailbox 20 is at liberty of selecting which of a plurality of intended recipients (or sets of intended recipients) is the appropriate one for a particular voice mail message.

In a specific case of the embodiment shown in FIG. 7, consider the case where the number of conversion entities 14A, 14B, ..., 14N corresponds to the number of mailboxes in the voice mail system 12. Each of the conversion entities 14A, 14B, ..., 14N continues to be reachable over the PSTN 32 (either directly or via the gateway 36 and the data network 34) at a unique designated telephone number. However, in this specific case, each of the conversion entities 14A, 14B, ..., 14N is uniquely associated with a respective mailbox in the voice mail system 12. Thus, the mere fact that a particular conversion entity is at the receiving end of a forwarded voice mail message signifies that there is an intent to render an electronic representation of that voice mail message accessible to the owner of the mailbox that is associated with the particular conversion entity. Since each conversion entity knows the address of the intended recipient a priori, there is no need for the conversion entity to store a database that maps originating mailboxes to associated addresses.

Those skilled in the art will appreciate that in some embodiments, the functionality of the conversion entities 14, 14A, 14B, ..., 14N may comprise pre-programmed hardware or firmware elements (e.g., application specific integrated circuits (ASICs), electrically erasable programmable readonly memories (EEPROMs), etc.), or other related components. In other embodiments, the conversion entities 14, 14A, 14B, ..., 14N may comprise an arithmetic and logic unit (ALU) having access to a code memory (not shown) which stores program instructions for the operation of the ALU. The program instructions could be stored on a medium which is fixed, tangible and readable directly by the conversion entities 14, 14A, 14B, ..., 14N (e.g., removable diskette, CD-ROM, ROM, or fixed disk), or the program instructions could be stored remotely but transmittable to the conversion entities 14, 14A, 14B, ..., 14N via a modem or other interface device (e.g., a communications adapter) connected to a network over a transmission medium. The transmission medium may be either a tangible medium (e.g., optical or analog communications lines) or a medium implemented using wireless techniques While specific embodiments of the present invention have been described and illustrated, it will be apparent to those skilled in the art that numerous modifications and variations can be made without departing from the scope of the invention as defined in the appended claims.

What is claimed is:

1. A method for execution in an architecture comprising a voice mail system and a conversion entity reachable over a telephone network at a designated telephone number, the method comprising:

the voice mail system interacting with a user to allow the user to access a particular voice mail message held in a mailbox;

the voice mail system receiving a command indicative of an intent of the user to forward the particular voice mail message to the conversion entity;

the voice mail system dialing the designated telephone number to reach the conversion entity over the telephone network;

the voice mail system forwarding the particular voice mail message to the conversion entity over the telephone network;

the conversion entity receiving the particular voice mail message forwarded by the voice mail system;

the conversion entity creating an electronic representation of the particular voice mail message;

the conversion entity determining a destination identifier for delivery of the electronic representation of the particular voice mail message; and the conversion entity delivering the electronic representation of the particular voice mail message to the destination identifier.

2. The method defined in claim 1, wherein when forwarded by the voice mail system, the particular voice mail message is accompanied by ancillary data identifying the mailbox.

3. The method defined in claim 2, wherein delivering the electronic representation of the particular voice mail message comprises:

sending a message containing the electronic representation of the particular voice mail message to the destination identifier.

4. The method defined in claim 3, wherein the destination identifier comprises an address hosted by a service provider with which an owner of the mailbox has an account.

5. The method defined in claim 3, wherein the destination identifier identifies a device associated with an owner of the mailbox.

6. The method defined in claim 3, the mailbox being a particular mailbox, wherein said determining a destination identifier comprises consulting a database populated with entries each specifying an originating mailbox and at least one associated address in an attempt to find an entry specifying the particular mailbox, thereby to obtain the destination identifier.

7. The method defined in claim 6, wherein the database is populated during a registration phase that precedes receiving the particular voice mail message.

8. The method defined in claim 2, wherein the destination identifier is a second address associated with an owner of the mailbox, wherein delivering the electronic representation of the particular voice mail message to the destination identifier comprises:

determining a first address associated with the owner of the mailbox;

sending a first message to the first address;

sending a second message to the second address;

wherein the second message contains the electronic representation of the particular voice mail message;

wherein the first message notifies of transmission of the second message.

9. The method defined in claim 8, wherein the second address is hosted by a service provider with which the owner of the mailbox has an account.

10. The method defined in claim 9, wherein the first address identifies a device associated with the owner of the mailbox.

11. The method defined in claim 8, wherein said sending a first message is done over a wireless network.

12. The method defined in claim 11, wherein said sending a second message is done over the Internet.

13. The method defined in claim 8, the mailbox being a particular mailbox, wherein said determining a first address and said determining a destination identifier consulting a database populated with entries each specifying an originating mailbox and at least two associated addresses in an attempt to find an entry specifying the particular mailbox, thereby to obtain the first address and the second address associated with the owner of the particular mailbox.

14. The method defined in claim 13, wherein the database is populated during a registration phase that precedes receiving the particular voice mail message.

15. Computer-readable media tangibly embodying a program of instructions executable by a computer to perform the method defined in claim 1.

16. The method defined in claim 2, wherein the ancillary data further identifies the voice mail system.

17. The method defined in claim 1, wherein the electronic representation of the particular voice mail message comprises a file for attachment to an electronic message.

18. The method defined in claim 17, wherein the file is at least one of a text file and an audio file.

19. The method defined in claim 1, wherein said creating an electronic representation of the particular voice mail message comprises converting the particular voice mail message from a first format into a second format different from the first format.

20. The method defined in claim 19, wherein the first format is an audio format and the second format is a text format.

21. The method defined in claim 19, wherein the first format and the second format are both audio formats.

22. The method defined in claim 1, wherein delivering the electronic representation of the particular voice mail message to the destination identifier comprises:

sending a message containing the electronic representation of the particular voice mail message to an address uniquely associated with the designated telephone number.

23. The method defined in claim 1, wherein the destination identifier is a second address associated with an owner of the mailbox, wherein delivering the electronic representation of the particular voice mail message to the destination identifier comprises:
 sending a first message to a first address associated with the owner of the particular mailbox;
 sending a second message to the second address;
 wherein the second message contains the electronic representation of the particular voice mail message;
 wherein the first message notifies of transmission of the second message;
 wherein the combination of the first and second addresses is uniquely associated with the designated telephone number.

24. A system comprising:
 a voice mail component and a conversion entity, the conversion entity being reachable over a telephone network at a designated telephone number,
 wherein the voice mail component is configured to:
  interact with a user to allow the user to access a particular voice mail message held in a mailbox;
  receive a command indicative of an intent of the user to forward the particular voice mail message to the conversion entity;
  dial the designated telephone number to reach the conversion entity over the telephone network;
  forward the particular voice mail message to the conversion entity over the telephone network;
 wherein the conversion entity is configured to:
  receive the particular voice mail message forwarded by the voice mail component;
  create an electronic representation of the particular voice mail message;
  determine a destination identifier for delivery of the electronic representation of the particular voice mail message; and
  deliver the electronic representation of the particular voice mail message to the destination identifier.

25. The system defined in claim 24, wherein when forwarded by the voice mail component, the particular voice mail message is accompanied by ancillary data identifying the mailbox.

26. The system defined in claim 25, wherein the conversion entity is further configured for:
 attaching the electronic representation of the particular voice mail message to an electronic message; wherein to deliver the electronic representation of the particular voice mail message to the destination identifier, the conversion entity is configured for:
 sending the electronic message to an address associated with an owner of the particular mailbox.

27. The system defined in claim 25, wherein the conversion entity is further configured for:
 sending a first electronic message to a first address associated with an owner of the particular mailbox;
 attaching the electronic representation of the particular voice mail message to a second electronic message;
 sending the second electronic message to a second address associated with the owner of the particular mailbox;
 wherein the first electronic message notifies of transmission of the second electronic message.

28. The system defined in claim 25, wherein the conversion entity is further configured for:
 sending a message containing the electronic representation of the particular voice mail message to the destination identifier.

29. The system defined in claim 28, wherein the destination identifier comprises an address hosted by a service provider with which an owner of the mailbox has an account.

30. The system defined in claim 28, wherein the destination identifier identifies a device associated with an owner of the particular mailbox.

31. The system defined in claim 28, wherein the conversion entity is connected to a data network and wherein said sending a message is done over the data network.

32. The system defined in claim 28, wherein the mailbox is a particular mailbox, and wherein to determine a destination identifier, the conversion entity is configured for: consulting a database populated with entries each specifying an originating mailbox and at least one associated address in an attempt to find an entry specifying the particular mailbox, thereby to obtain the destination identifier.

33. The system defined in claim 25, wherein the destination identifier is a second address associated with an owner of the mailbox, and wherein to deliver the electronic representation of the particular voice mail message to the destination identifier, the conversion entity is configured for:
 determining a first address associated with the owner of the particular mailbox;
 sending a first message to the first address;
 sending a second message to the second address;
 wherein the second message contains the electronic representation of the particular voice mail message;
 wherein the first message notifies of transmission of the second message.

34. The system defined in claim 33, the mailbox being a particular mailbox, wherein to determine the first and second addresses, the conversion entity is configured for: consulting a database populated with entries each specifying an originating mailbox and at least two associated addresses in an attempt to find an entry specifying the particular mailbox, thereby to obtain the first address and the second address associated with the owner of the particular mailbox.

35. The system defined in claim 24, wherein to deliver the electronic representation of the particular voice mail message to the destination identifier, the conversion entity is configured for:
 sending a message containing the electronic representation of the particular voice mail message to an address associated with an owner of the particular mailbox and uniquely associated with the designated telephone number at which said conversion entity is reachable.

36. The system defined in claim 24, wherein the destination identifier is a second address associated with an owner of the mailbox, wherein to deliver the electronic representation of the particular voice mail message to the destination identifier, the conversion entity is configured for:
 sending a first message to a first address associated with the owner of the particular mailbox;
 sending a second message to the second address;
 wherein the second message contains the electronic representation of the particular voice mail message;
 wherein the first message notifies of transmission of the second message;
 wherein the combination of the first and second addresses is uniquely associated with the designated telephone number at which said conversion entity is reachable.

* * * * *